United States Patent
Ferm et al.

[15] 3,677,409
[45] July 18, 1972

[54] SEWAGE TREATMENT SYSTEM

[72] Inventors: Carl W. Ferm, 950 Main Street, South Williamsport; Fred R. Sechler, 2025 Mahaffey Lane, Williamsport, both of Pa. 17701

[22] Filed: Oct. 15, 1970

[21] Appl. No.: 80,942

[52] U.S. Cl. ............................................210/195, 210/221
[51] Int. Cl. ...........................................................C02c 1/12
[58] Field of Search................210/7, 14, 15, 220, 221, 195, 210/197

[56] References Cited

UNITED STATES PATENTS 3,438,499  4/1969  Reckers ..............................210/195 X
2,987,186  6/1961  Burgoon et al. .......................210/197
3,495,711  2/1970  Englesson et al. ......................210/195

*Primary Examiner*—J. L. DeCesare
*Attorney*—Mason, Fenwick & Lawrence

[57] ABSTRACT

A sewage treatment system in which a bulbous shaped fiberglass tank is provided with an inlet and an outlet with an internal divider plate separating the tank into an aeration compartment and a settling compartment and a continuously activated air-nozzle sludge removing conduit for removing sludge from the bottom of the settling compartment and filtering means upstream of the outlet for preventing the discharge of solid particles with a back-wash liquid air nozzle beneath the liquid surface for continuously back-washing the filter means and for creating surface turbulence in the settling compartment for enhancing the operation of an air-nozzle operated skimmer means mounted adjacent the surface of liquid in the settling compartment.

12 Claims, 5 Drawing Figures

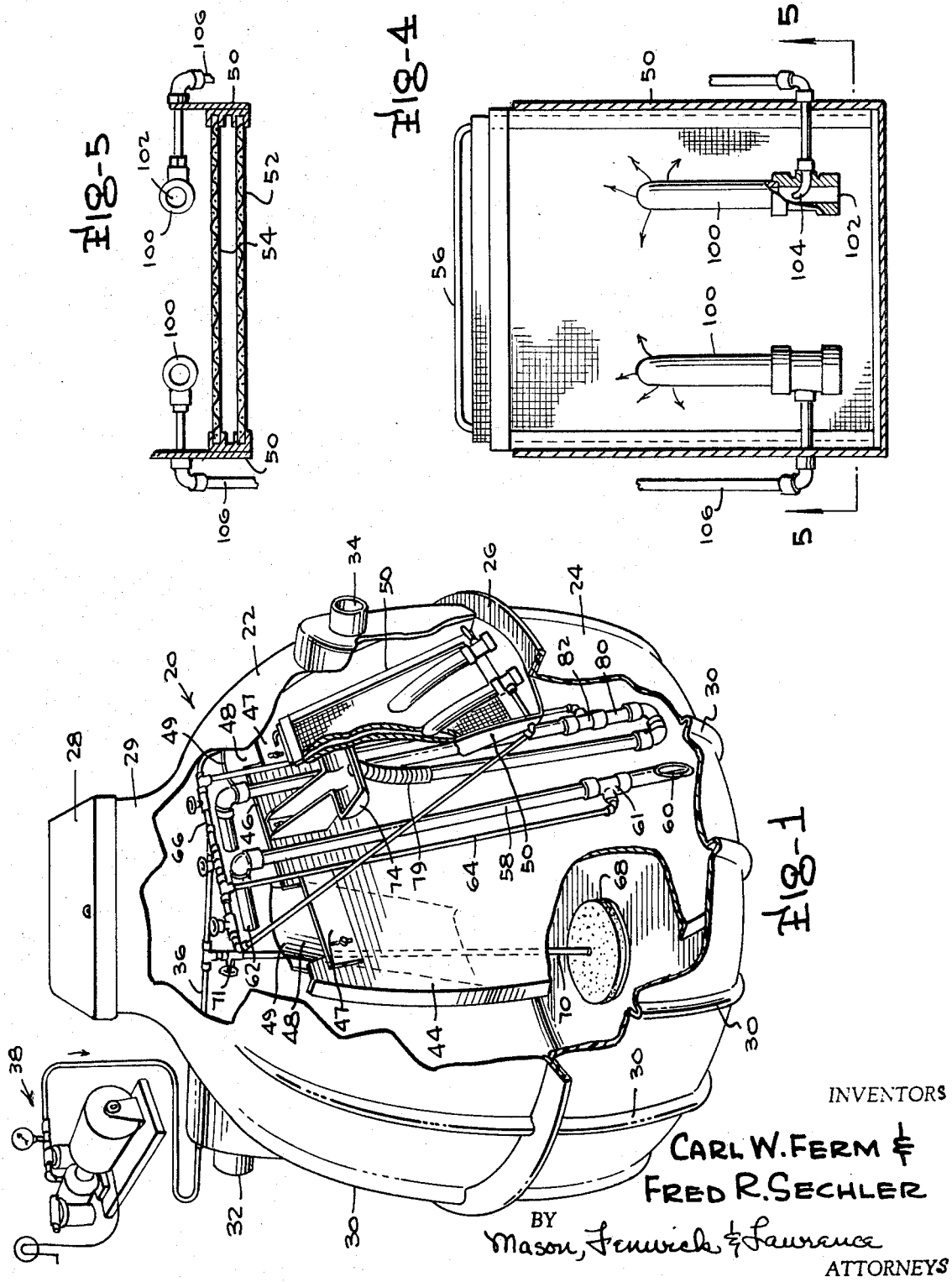

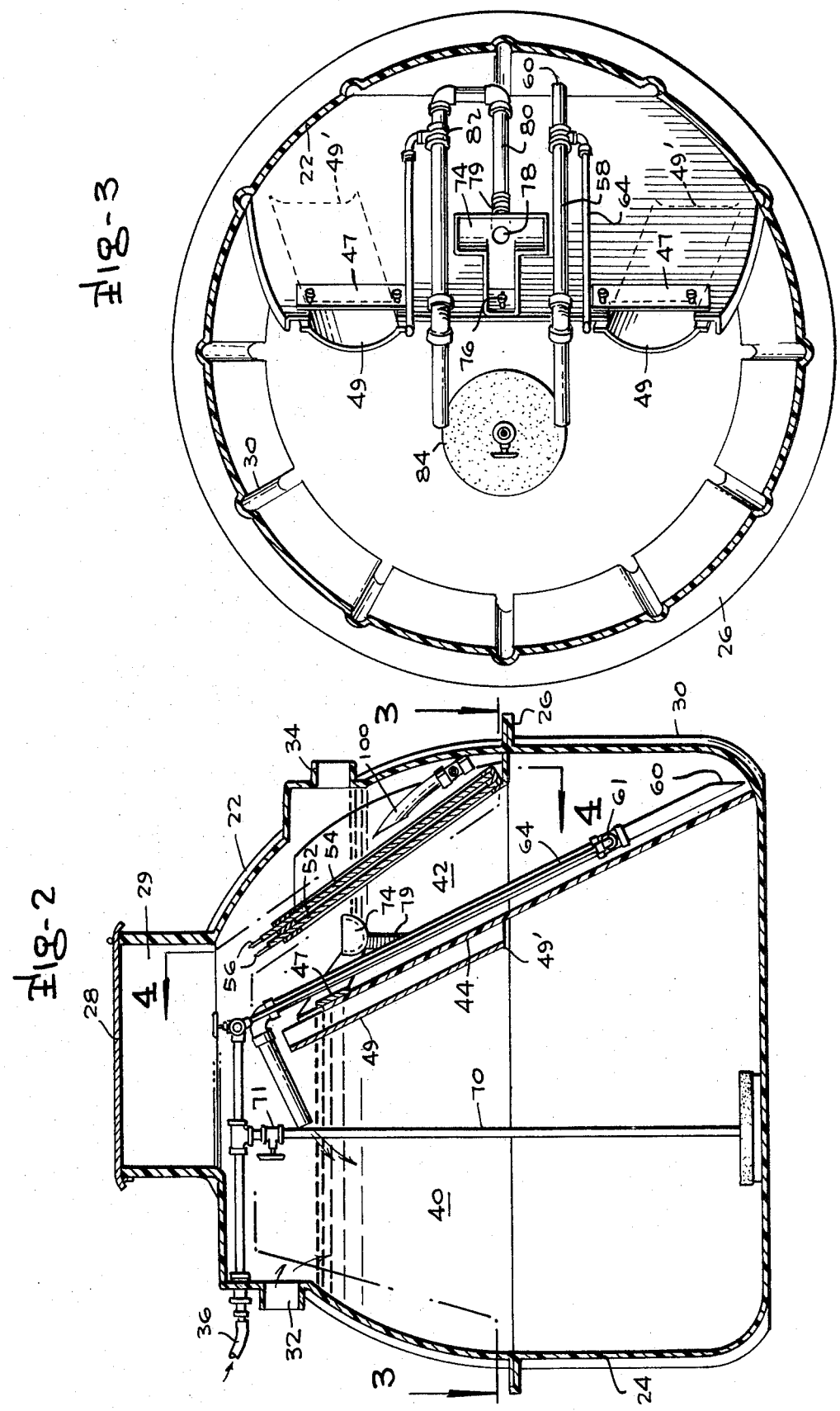

SEWAGE TREATMENT SYSTEM

This invention is in the field of sewage treatment systems and is specifically directed to a new and improved septic tank construction.

Many prior systems have evolved for the purpose of treating sewage to remove its undesirable qualities. While most of the prior known systems have been satisfactory in some respects, there has been a never-ending effort, which has become all the more important in recent times, to improve the functional efficiency of such systems and to reduce the cost of such systems. For example, many of the prior known systems have inherently required construction or assembly of the systems at the site in which they are to be installed. Frequently, such systems require the preparation of concrete forms or the like along with the necessary pouring of concrete etc. Such systems are obviously expensive to construct. Other prior known systems have attempted to overcome the deficiencies of such on-the-site constructions by the expedient of prepoured tanks and the like which are formed at a factory or other assembly site and then transported to the installation site. Unfortunately, the size of such installations has largely been limited by virtue of the weight and cost of moving such devices.

Other prior known sewage treatment systems have been functionally deficient by virtue of a tendency to permit the sedimentation of sludge to the extent that the capacity of the tank is soon diminished and the tank must consequently be opened to permit the removal of excess sludge.

Other problems have been encountered by virtue of the failure of prior known systems to adequately dissipate the solid materials in the sewage in order to prevent the discharge of solid materials from the tank. Filters have been employed for this purpose in the past; however, many of the prior systems have encountered difficulty with the operation of such filter means due to their propensity to become clogged after any extended use.

It has been previously recognized that it is desirable in an activated sludge system to recycle sludge from a settling compartment into an aeration compartment in order to maintain a high oxygen content in both compartments. Otherwise, a lowering of the oxygen content in the settling compartment would result in a deleterious effect upon the material in that compartment. Prior known systems for achieving this purpose have been complicated and expensive in that they have required the use of scrapers and the like for returning the sludge to the separate aeration tank.

Therefore, it is the primary object of this invention to provide a new and improved sewage treatment apparatus.

Obtainment of the object of this invention is enabled through the provision of a bulbous shaped fiberglass tank having a flat bottom portion and divided into an aeration compartment and a settling compartment by an internal divider plate extending across the width of the tank. Overflow from the aeration compartment moves across the upper edge of the divider plate into the aeration compartment. A sludge removing conduit extending from the bottom of the aeration compartment up over the upper edge of the divider plate has an internal air nozzle for creating a pumping action from the bottom of the settling compartment by virtue of flow created by the air nozzle and this conduit consequently moves the sludge from the bottom of the settling compartment over the dividing plate for return to the aeration chamber.

Similarly, an open topped skimmer bowl is adjustably positioned adjacent the water level in the settling compartment with a pipe communicating with the bottom of the skimmer bowl so that an internal air nozzle in the pipe creates suction in the bowl for removing foam and floating solid materials from the settling compartment and returning same over the divider plate into the aeration compartment. A removable filter screen is located upstream of the outlet from the tank and a nozzle positioned downstream of the filter screen and pointed to discharge against the downstream side of the screen serves to continuously back-wash the screen for preventing clogging thereof. Adjustable dam plates are provided along the top edge of the divider plate for adjusting the flow of liquid across the divider plate in the event that the tank may be slightly tilted with respect to the vertical axis.

A better understanding of the preferred embodiment of this invention will be understood with reference to the drawings, in which:

FIG. 1 is a perspective view of the preferred embodiment with portions removed to illustrate the internal parts with clarity;

FIG. 2 is a bisecting sectional view of the preferred embodiment;

FIG. 3 is a sectional view taken along lines 3—3 of FIG. 2;

FIG. 4 is a sectional view taken along lines 4—4 of FIG. 2; and

FIG. 5 is a sectional view taken along lines 5—5 of FIG. 4.

Attention is initially invited to FIG. 1 for a discussion of the preferred embodiment, the main component of which comprises a bulbous tank generally designated 20 which is formed of an upper portion 22 and a lower portion 24 joined at a circumferential belt-like flange 26. Tank 20 is made of fiberglass and the upper portion and the lower portion are connected at flange 26 by a solvent weld in a conventional manner. A removable cover lid 28 is mounted on the upper end of the upper portion 22 for providing access to the interior of tank 20 through an open-topped neck portion 29. Additionally, both the upper portion 22 and the lower portion 24 of tank 20 are provided with strengthening ribs 30 which cooperate with the circumferential flange 26 to provide an extremely sturdy construction.

An inlet conduit 32 communicating with the interior of tank 20 serves to provide a flow of raw untreated sewage into the tank and an outlet conduit 34 permits the discharge of treated effluent from the tank. Additionally, an air pressure line 36 from a conventional air compressor means 38 extends into the interior of the tank 20 for providing pressurized air for various purposes as will be discussed hereinafter.

Tank 20 is divided into an aeration compartment 40 and a settling compartment 42 by a tank divider in the form of an inclined fiberglass plate member 44 which extends across the width of the tank between the inlet 32 and the outlet 34 as best shown in FIG. 2. Divider plate 44 has an upper edge 46 in which a pair of rectangular slots 48 (FIG. 1) are provided through which flow from the aeration compartment into the settling compartment occurs. Additionally, a pair of vertically adjustable dam plates 47 are mounted for vertical adjustment adjacent slots 48 near the upper edge 46 of plate 44. The purpose of enabling adjustment of dam plates 47 is to adjust the flow across the plates to maintain even flow in the event that the tank 20 may be tilted somewhat from the vertical. Additionally, a curved baffle member 49 is positioned in front of slots 48 for preventing the discharge of large floating particles through slots 48 into the settling compartment 42. It should be noted that the baffle members 49 diverge outwardly from top to bottom so that their lower ends 49' are positioned adjacent the wall of the tank 20 in an area in which liquid movement is in a downward direction.

A filter screen supporting frame 50 formed of plates extending from the inner wall of upper portion 22 is provided in the settling compartment upstream of the outlet 45 for supporting a pair of filter screens 52 and 54 which are normally of different mesh size. Each screen is provided with a handle 56 which can be manually grasped to enable removal of the screen in an obvious manner. It should be noted that all effluent must pass through screens 52 and 54 before it can be discharged from tank 20. However, al though two screens are shown, a single screen could be employed if desired. The number of screens and the mesh size of the screens would be selected in accordance with the nature of the material being treated.

Sludge removing means in the form of a conduit 58 having an inlet opening 60 (FIG. 1) adjacent the bottom of the settling compartment 40 serves to remove sludge from the bottom of the settling compartment for recycling into the aeration chamber. Removal of the sludge is enabled by an air nozzle on the interior of a fitting 61 of conduit 58 which nozzle is directed upwardly for creating flow into the inlet opening 60 up through the conduit 58 for discharge from an outlet opening 62 into the aeration compartment. The air nozzle in conduit 58 is connected to pressure line 36 by means of an air line 64 and a manifold 66 in an obvious manner.

Aeration means in the form of a ceramic diffuser 68 connected to air pressureline 36 by a line 70 is mounted on the bottom of the aeration compartment for providing continuous aeration of the material being treated in that compartment. Moreover, variation in the amount of air provided into the aeration compartment is enabled through the provision of a valve 72 in line 70. Air ejected from the diffuser means 68 creates an upflow of fluid into the central portion of the chamber and a downflow along the chamber wall. The fact that the lower ends 49' of the baffle members 49 are positioned in the downflow area is of great value in that this prevents floating solid materials from being pushed over the baffle by an upflow current as would occur if the lower ends of the baffle members were positioned in a portion of the chamber having an upflow of liquid.

Skimmer means in the form of an open-topped cup 74 is mounted adjacent the liquid level in the settling compartment 42. Open-topped cup 74 can be vertically adjusted by a thumb nut 76 connecting the cup to the divider plate 44 in an obvious manner. An opening 78 in the bottom of the open-topped cup 74 communicates through a flexible conduit 79 with a U-shaped skimmer conduit 80 having a section 82 in which an upwardly pointing air nozzle is mounted for creating flow into opening 78 through conduit 80 up over the edge 46 of plate 44 for discharge from a discharge opening 84 in the aeration compartment. The open-topped cup 74 is particularly effective in removing foam-like scum from adjacent the upper liquid surface in the aeration compartment. Moreover, the open-topped cup 74 also serves to remove floating particles from this upper surface. Additionally, it should be noted that operation of cup member 74 etc. is enhanced by virtue of other means to be discussed hereinafter.

Means for back-washing screens 52 and 54 is provided in the form of nozzle pipes 100 (FIG. 4) each having a lower open liquid inlet 102 and an internal air nozzle 104 which is connected to an air line 106 extending from the manifold 66. Pressurized air is ejected from nozzle 104 to create flow in the direction of the arrows in FIG. 4 whereby liquid enters the pipe 100 and is forcefully discharged upwardly against the downstream side of the screen. This discharge of liquid serves to remove solid particles from the upstream side of the screen and also provides a substantial amount of surface turbulence on the upstream side of the screen. The aforementioned surface turbulence serves to enhance the operation of the open-topped cup 74 etc. in removing scum and floating material from the surface in settling compartment 42. Nozzle 44 is essentially identical to the air nozzle employed in line 58 for providing a liquid flow in an analagous manner.

In operation, the subject device receives raw sewage through inlet 32 and discharges treated effluent through outlet 34. Pressurized air from compressor 38 is continuously provided through conduit 36 etc. to the manifold 66, the nozzle in conduit 58, the nozzle in section 82 and the nozzle 104. Hence, the tank is in continuous operation with the materials therein being in a constant state or motion and/or agitation. For this reason, an extremely effective treatment of the material is enabled and high functional efficiency is achieved.

Many variations of this invention will occur to those skilled in the art but which will not depart from the spirit and scope of the invention. Hence, it is to be understood that the invention is to be interpreted and limited solely in light of the appended claims.

We claim:

1. A sewage treatment system comprising tank means of circular configuration as viewed from above, inlet means in said tank means for introducing sewage to be treated into said tank means, outlet means connected to said tank means for discharging treated material, a tank divider having an upper edge extending across the width of said tank between said inlet means and said outlet means below the height of said inlet means to define an aeration compartment on the side of said tank divider toward said inlet means and a settling compartment on the side of said tank divider towards said outlet means whereby material passes from said aeration compartment over said upper edge of said tank divider and cascades into said settling compartment, aeration means for introducing air into said aertation compartment adjacent the bottom of said aeration compartment, sludge return means for returning sludge from adjacent the bottom of said settling compartment to said aeration compartment, removable filter screen means in said settling compartment positioned upstream of said outlet means and through which all effluent must pass for preventing discharge of solid materials by said outlet means and skimmer means for simultaneously removing solid materials floating on the surface of liquid in said settling compartment and foam-like scum from above the surface of said liquid in said settling compartment and for returning said removed solid materials and said foam-like scum to said aeration compartment.

2. The invention of claim 1 additionally including backwash liquid jet creating means beneath the surface of liquid in said settling compartment for creating and directing a liquid jet against the downstream side of said filter screen for backwashing said screen to remove particles from the upstream side of said screen.

3. The invention of claim 2 wherein said back-wash jet creating means includes a tubular nozzle pipe having an open lower end and an open upper discharge end and an intermediate interior air nozzle directing an air blast in a direction toward said upper discharge end whereby liquid surrounding said lower inlet end is drawn into said nozzle pipe and discharged upwardly against said filter screen to pass through said filter screen and create turbulence on the upper surface of the liquid on the upstream side of said filter screen to enhance the operation of said skimmer means.

4. The invention of claim 3 wherein said skimmer means comprises a shallow open-topped container having its upper surface adjacent the fluid level in said settling compartment and skimmer conduit means open on one end to communicate with the bottom of said open-topped container and having an opposite open discharge end over said aeration chamber and nozzle means in said skimmer conduit means with said air nozzle means being connected to a source of air pressure and being mounted within said skimmer conduit for creating flow from said open-topped container through said skimmer conduit to discharge from the end of said skimmer conduit in said aeration chamber.

5. The invention of claim 4 wherein said sludge return means comprises a conduit having an open end adjacent the bottom of said settling compartment and a discharge end above the liquid level in said aeration chamber, air nozzle means connected to a source of pressurized air and mounted on the interior of said sludge removing conduit adjacent the lower end thereof for creating flow in said sludge removing conduit from the lower end to the discharge end of said sludge removing conduit.

6. The invention of claim 5 wherein said tank means and said tank divider is formed of fiberglass.

7. The invention of claim 6 additionally including a removable cover attached to the top of said tank for permitting access to the interior of said tank.

8. The invention of claim 6 additionally including vertically adjustable dam means mounted adjacent the upper edge of said tank divider for adjusting the flow of material from said aeration compartment to said settling compartment.

9. The invention of claim 8 wherein said tank is of bulbous shape.

10. The invention of claim 8 wherein said vertically adjustable dam means comprises at least one vertically adjustable plate mounted adjacent a downwardly extending rectangular slot extending downwardly from the top edge of said tank divider and additionally including a curved baffle plate attached to said divider adjacent said downwardly extending slot on the aeration chamber side of said divider whereby surface flow from said aeration compartment into said settling compartment is prevented to keep floating material in said aeration compartment from being discharged into said settling compartment.

11. The invention of claim 10 wherein said sludge return means comprises a conduit having an open end adjacent the bottom of said settling compartment and a discharge end above the liquid level in said aeration chamber, air nozzle means connected to a source of pressurized air and mounted on the interior of said sludge removing conduit adjacent the lower end thereof for creating flow in said sludge removing conduit from the lower end to the discharge end of said sludge removing conduit.

12. The invention of claim 10 wherein there are two adjustable dam means mounted adjacent downwardly extending rectangular slots positioned adjacent each side of said tank divider and a curved baffle plate is associated with each of said slots with the lower ends of said curved baffle plate being positioned adjacent the tank wall out of alignment with the aeration means so that the lower ends of said baffle members are in a portion of the tank having liquid flow in a downward direction.

* * * * *